United States Patent
Dong

(10) Patent No.: US 12,477,513 B2
(45) Date of Patent: Nov. 18, 2025

(54) PAGING METHODS, PAGING APPARATUSES AND STORAGE MEDIA

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 476 days.

(21) Appl. No.: 17/997,395

(22) PCT Filed: Apr. 30, 2020

(86) PCT No.: PCT/CN2020/088517
§ 371 (c)(1),
(2) Date: Oct. 28, 2022

(87) PCT Pub. No.: WO2021/217666
PCT Pub. Date: Nov. 4, 2021

(65) Prior Publication Data
US 2023/0209501 A1    Jun. 29, 2023

(51) Int. Cl.
*H04W 72/12* (2023.01)
*H04W 68/02* (2009.01)
*H04W 72/23* (2023.01)

(52) U.S. Cl.
CPC ........... *H04W 68/02* (2013.01); *H04W 72/12* (2013.01); *H04W 72/23* (2023.01)

(58) Field of Classification Search
CPC ............................... H04W 72/23; H04W 72/12
USPC ....................................................... 370/329
See application file for complete search history.

(56) References Cited

U.S. PATENT DOCUMENTS

2018/0317244 A1    11/2018    Um et al.

FOREIGN PATENT DOCUMENTS

| CN | 107113774 A | 8/2017 |
| CN | 109286966 A | 1/2019 |
| CN | 110574456 A | 12/2019 |
| CN | 110972083 A | 4/2020 |

(Continued)

OTHER PUBLICATIONS

Combined Chinese Office Action and Search Report issued Apr. 19, 2024in Chinese Patent Application No. 202080000918.X (with unedited computer-generated English Translation), 21 pages.

(Continued)

*Primary Examiner* — Angel T Brockman
(74) *Attorney, Agent, or Firm* — Oblon, McClelland, Maier & Neustadt, L.L.P.

(57) ABSTRACT

The present disclosure relates to paging methods, paging apparatuses, and storage media. A paging method is applied to a network device and can include determining downlink control information, wherein the downlink control information comprises one or more bits of which a respective bit indicates whether there are one or more paging messages for a terminal group, and sending the downlink control information. A paging method is applied a terminal can include obtaining downlink control information, wherein the downlink control information comprises one or more bits of which a respective bit indicates whether there are one or more paging messages for a terminal group, and determining a terminal group to which the terminal belongs, and determining whether to receive paging messages or not based on the terminal group to which the terminal belongs and a bit corresponding to the terminal group.

19 Claims, 4 Drawing Sheets

S21

Obtain DCI, where the DCI includes one or more bits of which a respective bit indicates whether there are one or more paging messages for a terminal group

S22

Determine a terminal group to which the terminal belongs, and determine whether to receive paging messages or not based on the terminal group to which the terminal belongs and a bit indicating the terminal group

(56) References Cited

FOREIGN PATENT DOCUMENTS

| EP | 3 410 613 A1 | 12/2018 |
|---|---|---|
| WO | WO 2017/075835 A1 | 5/2017 |
| WO | WO 2018/171457 A1 | 9/2018 |
| WO | WO 2018/174659 A1 | 9/2018 |
| WO | WO 2018/201499 A1 | 11/2018 |
| WO | WO 2019/096035 A1 | 5/2019 |

OTHER PUBLICATIONS

Written Opinion of the International Searching Authority issued Jan. 21, 2021 in PCT/CN2020/088517 (with English Translation), 9 pages.
International Search Report Issued Jan. 21, 2021, in PCT/CN2020/088517, filed on Apr. 30, 2020, 2 pages.
"UE power saving for paging", Huawei, et al., 3GPP TSG RAN WG1 Meeting #95 R1-1812685, Spokane, USA, Nov. 12-16, 2018, 4 pages.
Chinese Office Action issued Aug. 8, 2024 in Chinese Patent Application No. 202080000918.X (with unedited computer-generated English Translation), 19 pages.
Combined Chinese Notice of Allowance and Search Report issued Dec. 29, 2024 in Chinese Patent Application No. 202080000918.X, 5 pages.
3GPP support, "Draft Minutes v02 of the 40th 3GPP TSG RAN meeting", Prague, Czech Republic, May 27-30, 2008, R5-083015, 106 pages.
Dong-Hai et al, "UE Cell Location based on Paging Message in LTE", Communications Technology, vol. 52 No. 4, Apr. 2019, 5 pages.
Papandreou et al., "Open Block Characterization and Read Voltage Calibration of 3D QLC NAND Flash", 2020 IEEE International Reliability Physics Symposium (IRPS), Jan. 1, 2020, 6 page.

PAGING METHODS, PAGING APPARATUSES AND STORAGE MEDIA

CROSS REFERENCE TO RELATED APPLICATIONS

This application is the national phase of International Application No. PCT/CN2020/088517 filed on Apr. 30, 2020, the disclosure of which is hereby incorporated by reference in its entirety for all purposes.

BACKGROUND OF THE INVENTION

Field of the Invention

The present disclosure relates to the field of communication technologies, in particular to a paging method, a paging apparatus and a storage medium.

Description of the Related Art

In the related art, when a terminal is in a radio resource control idle (RRC-IDLE) state or a radio resource control inactive (RRC-INACTIVE) state, the terminal needs to periodically listen to a paging message. After receiving a paging message, the terminal will enter a radio resource control connected (RRC-CONNECTED) state for normal communication. The paging message is carried in a physical downlink shared channels (PDSCH), and need to be scheduled by downlink control information (DCI) scrambled by a paging radio network temporary identity (P-RNTI). A paging occasion (PO) for a terminal appears periodically. A plurality of terminals may use PO resources in a same period, that is, paging messages of a plurality of terminals may appear in one PO.

However, in the case where a plurality of terminals correspond to a PO, when a terminal receives DCI indicating that there are paging messages, it is necessary to demodulate the one or more PDSCHs completely before the terminal can determine whether there is paging message for itself. There are cases where the terminal finds that there is no paging message for itself after demodulating the one or more PDSCHs, which will waste the energy of the terminal and affect the battery life.

SUMMARY OF THE INVENTION

According to a first aspect of the embodiments of the present disclosure, there is provided a paging method applied to a network device. The paging method includes determining downlink control information, wherein the downlink control information comprises one or more bits of which a respective bit indicates whether there are one or more paging messages for a terminal group, and sending the downlink control information.

According to a second aspect of the embodiments of the present disclosure, there is provided a paging method applied to a terminal. The paging method includes obtaining downlink control information, wherein the downlink control information comprises one or more bits of which a respective bit indicates whether there are one or more paging messages for a terminal group; and determining a terminal group to which the terminal belongs, and determining whether to receive paging messages or not based on the terminal group to which the terminal belongs and a bit corresponding to the terminal group.

According to a third aspect of the embodiments of the present disclosure, there is provided a paging apparatus, including a processor and a memory configured to store instructions executable by the processor. The processor is configured to execute the paging method described in the first aspect or any of the embodiments of the first aspect.

According to a fourth aspect of the embodiments of the present disclosure, there is provided a paging apparatus, including a processor and a memory configured to store instructions executable by the processor. The processor is configured to execute the paging method described in the second aspect or any of the embodiments of the second aspect.

According to a fifth aspect of the embodiments of the present disclosure, there is provided a non-transitory computer readable storage medium. When instructions in the storage medium are executed by a processor of a network device, the network device is enabled to execute the paging method described in the first aspect or any of the embodiments of the first aspect.

According to a sixth aspect of the embodiment of the present disclosure, there is provided a non-transitory computer readable storage medium. When instructions in the storage medium are executed by a processor of a mobile terminal, the mobile terminal is enabled to execute the paging method described in the second aspect or any of the embodiments of the second aspect.

It should be understood that the above general description and the following detailed description are exemplary and explanatory only, and do not limit the present disclosure.

BRIEF DESCRIPTION OF THE DRAWINGS

The accompanying drawings, which are incorporated into and constitute a part of the specification, illustrate embodiments consistent with the present disclosure, and together with the specification serve to explain the principles of the present disclosure.

DETAILED DESCRIPTION OF THE PREFERRED EMBODIMENTS

Exemplary embodiments will be described in detail herein, examples of which are illustrated in the accompanying drawings. When the following description refers to the drawings, unless otherwise indicated, the same numerals in different drawings indicate the same or similar elements. The embodiments described below do not represent all embodiments consistent with embodiments of the present disclosure. Rather, they are merely examples of apparatus and method consistent with some aspects of the embodiments of the present disclosure, as recited in the appended claims.

Figure 1:
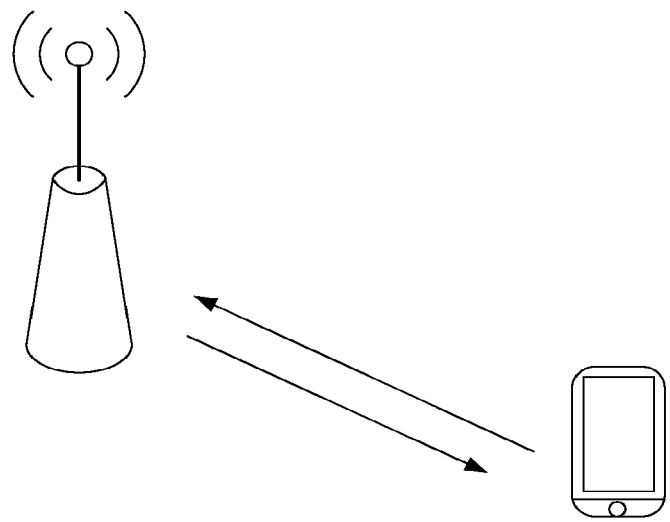
FIG. 1 is a schematic diagram illustrating a wireless communication system architecture according to an exemplary embodiment.

Paging methods according to embodiments of the present disclosure can be applied to a wireless communication system shown in FIG. 1. As shown in FIG. 1, the wireless communication system includes a terminal and a network device. The terminal is connected to the network device through wireless resources, and transmits and receives data.

It can be understood that the wireless communication system shown in FIG. 1 is only for exemplary illustration, and the wireless communication system may also include other network devices, such as a core network device, a wireless relay device, and a wireless backhaul device, not shown in FIG. 1. The embodiments of the present disclosure do not limit the number of network devices and the number of terminals included in the wireless communication system.

It can be further understood that the wireless communication system in the embodiments of the present disclosure is a network that provides wireless communication functions. The wireless communication system may use different communication technologies, such as code division multiple access (CDMA), wideband code division multiple access (WCDMA), time division multiple access (TDMA), frequency division multiple access (FDMA), orthogonal frequency division multiple access (OFDMA), single carrier FDMA (SC-FDMA), and carrier sense multiple access with collision avoidance. According to the capacity, speed, delay and other factors of different networks, networks may be divided into 2G (generation) networks, 3G networks, 4G networks or future evolution networks, such as 5G networks. The 5G network may also be called a new radio (NR). For the convenience of description, the wireless communication network is sometimes referred to as a network for short in the present disclosure.

Further, the network device involved in the present disclosure may also be referred to as a wireless access network device. The wireless access network device may be a base station, an evolved base station (evolved node B), a home base station, an access point (AP) in a wireless fidelity (WIFI) system, a wireless relay node, a wireless backhaul node, a transmission point (TP), or a transmission and reception point (TRP), etc., may also be a gNB in a NR system, or may also be a component or part of the devices that constitute the base station, etc. When the wireless communication system is a vehicle-to-vehicle (V2X) communication system, the network device may also be a vehicle-mounted device. It should be understood that, in the embodiments of the present disclosure, the specific technology and the specific device form adopted by the network device are not limited.

Further, the terminal involved in the present disclosure may also be referred to as a terminal device, user equipment (UE), a mobile station (MS), a mobile terminal (MT), etc., which is a kind of device that provides user with voice and/or data connectivity. For example, the terminal may be a handheld device with a wireless connection function, a vehicle-mounted device, etc. Currently, some examples of the terminal are a smart phone (or mobile phone), a pocket personal computer (PPC), a handheld computer, a personal digital assistant (PDA), a notebook computer, a tablet computer, a wearable device, or a vehicle-mounted device, etc. In addition, when the wireless communication system is a vehicle-to-vehicle (V2X) communication system, the terminal device may also be a vehicle-mounted device. It should be understood that the embodiments of the present disclosure do not limit the specific technology and the specific device form adopted by the terminal.

In relevant art, a terminal can be in a radio resource control idle (RRC-IDLE) state, a radio resource control inactive (RRC-INACTIVE) state or a radio resource control connected (RRC-CONNECTED) state. When the terminal is in the RRC-IDLE state or RRC-INACTIVE state, it needs to periodically listen to a paging message. After receiving a paging message, the terminal will enter the RRC-CONNECTED state for normal communication. The paging message is carried in a physical downlink shared channels (PDSCH), and need to be scheduled by downlink control information (DCI) scrambled by a paging radio network temporary identity (P-RNTI), A paging occasion (PO) for a terminal appears periodically. A plurality of terminals may use PO resources in a same period, that is, paging messages for a plurality of terminals may appear in one PO.

The process of a terminal listening to a paging message is as follows. The terminal listens for whether there is DCI scrambled by P-RNTI in a PO. If DCI scrambled by P-RNTI is detected in the PO, and a Short Messages Indicator information field in the DCI indicates that the DCI has scheduled one or more PDSCHs carrying paging messages, the terminal will receive and demodulate the PDSCHs according to the DCI indication. If no DCI scrambled by P-RNTI is detected, or there is such DCI, but the Short Messages Indicator information field in the DCI indicates there is no paging message, the terminal does not need to receive and demodulate the PDSCHs. The PDSCHs carry a paging record table, which includes terminal identities (IDs) of all terminals paged corresponding to the PO. The terminal ID used for paging in the NR system is generally 5G-S-TMSI, with a length of 48 bits. If the terminal finds its own terminal ID in the paging record table, it means that the terminal has been paged and needs to switch to the RRC-CONNECTED state for normal communication. If there is no terminal ID of the terminal in the paging record table, it means that the terminal is not paged and can remain in the RRC-IDLE state or the RRC-INACTIVE state.

In the above paging process, it is quite common that a plurality of terminals correspond to one PO. When a plurality of terminals correspond to one PO, each terminal does not know whether there are other terminals in the PO corresponding to the terminal. When the terminal receives the DCI indication that there are paging messages, it is not clear whether the paging messages carried in the PDSCHs are for the terminal. It is necessary to demodulate the PDSCHs completely before the terminal can determine whether there is paging message for itself. Therefore, there are cases where the terminal finds that there is no paging message for itself after demodulating the PDSCHs, which will waste the energy of the terminal and affect the battery life.

To overcome the problems in the related art, the present disclosure provides a paging method, a paging apparatus and a storage medium.

In the NR system, DCI 1-0 can be used to schedule paging messages. When DCI 1-0 is used to schedule paging messages, some bits in the information field of DCI will be in a reserved state. The bits in the reserved state can be understood to be reserved but not used for any purpose. For example, when the Short Messages Indicator information field in DCI 1-0 indicates "there is no short message, but there are paging messages", 8 bits in the Short Messages information field will be in a reserved state. A last information field in DCI 1-0 in a licensed spectrum is 6 bits which are always in the reserved state, or a last information field in DCI 1-0 in an unlicensed spectrum is 8 bits which are always in the reserved state. No matter whether there is a short message or not, the $3^{rd}$-$8^{th}$ bits of the 8 bits in the Short Messages information field in the current protocol version are in the reserved state.

In view of this, an embodiment of the present disclosure provides a paging method. In the paging method, at least part of the bits in the reserved state in the DCI are used to indicate whether there are paging messages for one or more terminal groups, and a terminal can determine whether there are one or more paging messages for a terminal group to which the terminal belongs based on the received DCI. When the DCI indicates that there is no such one or more paging messages for the terminal group, the terminal will not receive paging messages or demodulate the paging messages, thereby saving energy for the terminal.

Figure 2:
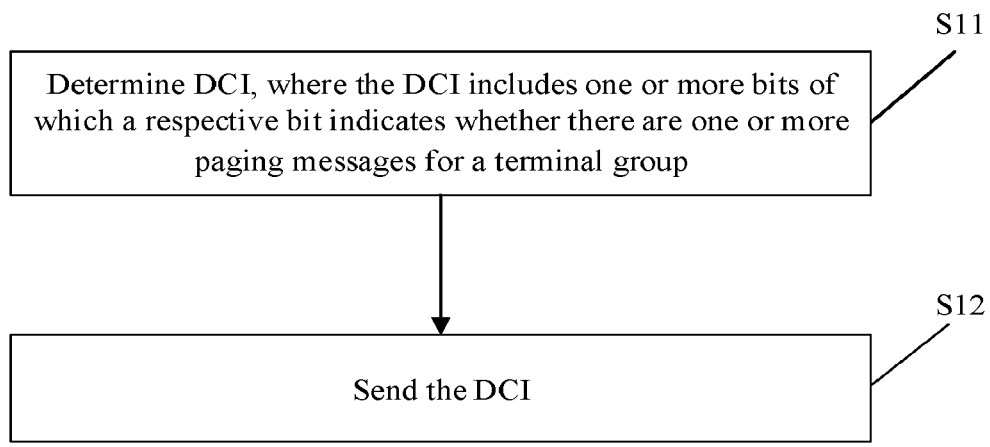
FIG. 2 is a flowchart of a paging method shown according to an exemplary embodiment.

FIG. 2 is a flowchart of a paging method according to an exemplary embodiment. As shown in FIG. 2, the paging method is used in a network device and includes steps S11 and S12.

In step S11, DCI is determined, where the DCI includes one or more bits of which a respective bit indicates whether there are one or more paging messages for a terminal group.

In an embodiment of the present disclosure, at least part of bits in a reserved state in the DCI can be determined as the one or more bits of which a respective bit indicates whether there are one or more paging messages for a terminal group.

In step S12, the DCI is sent. In the embodiment of the present disclosure, a respective bit in the DCI indicates whether there are one or more paging messages for a terminal group, and the terminal can determine whether there are one or more paging messages for a terminal group to which the terminal belongs based on the received DCI. When the DCI indicates that there is no such one or more paging messages for the terminal group, the terminal will not receive paging messages or demodulate the paging messages, thereby saving energy for the terminal.

Figure 3:
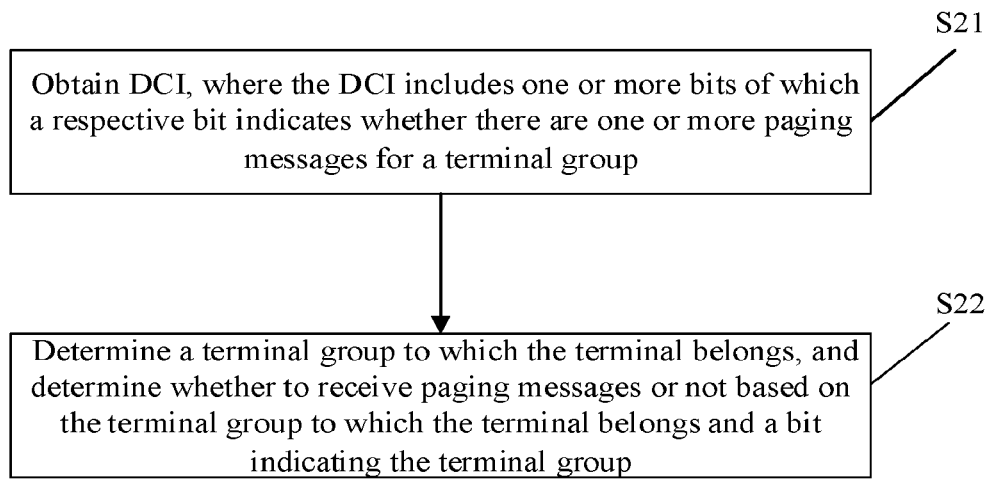
FIG. 3 is a flowchart of a paging method shown according to an exemplary embodiment.

FIG. 3 is a flowchart of a paging method according to an exemplary embodiment. As shown in FIG. 3, the paging method is used in a terminal and includes steps S21 and S22.

In step S21, DCI is obtained, where the DCI includes one or more bits of which a respective bit indicates whether there are one or more paging messages for a terminal group.

In step S22, a terminal group to which the terminal belongs is determined, and whether to receive paging messages or not is determined based on the terminal group to which the terminal belongs and a bit among the one or more bits indicating the terminal group to which the terminal belongs.

In the embodiment of the present disclosure, the terminal determines the terminal group to which the terminal belongs. When it is determined that the bit corresponding to the terminal group to which the terminal belongs indicates that there is no paging message for the terminal group, the terminal determines that it is not necessary to receive and demodulate one or more PDSCHs carrying paging messages. When it is determined that the bit corresponding to the terminal group to which the terminal belongs indicates that there are one or more paging messages for the terminal group, the terminal determines that one or more PDSCHs carrying such one or more paging messages needs to be received and demodulated.

It can be understood that, since a bit in the reserved state indicates a terminal group, and the paging messages may include paging messages for other terminals than the terminal in the same terminal group, there is a case where the terminal determines that there is no paging message for the terminal itself after demodulating the PDSCHs carrying the one or more paging messages. However, compared with receiving and demodulating all PDSCHs carrying paging messages indicated by the DCI, the terminal power consumption can still be reduced to a certain extent, thus saving energy for the terminal.

The paging methods involved in the above embodiments will be described below in combination with practical applications in the embodiments of the present disclosure.

In an exemplary embodiment of the present disclosure, the DCI used to indicate whether there are paging messages for terminal groups can be DCI for scheduling paging messages.

In an embodiment of the present disclosure, N bits of reserved bits in the DCI for scheduling paging messages can indicate whether there are paging messages for the terminal groups. The value of N is a positive integer, which is less than or equal to the number of bits in the reserved state in the DCI.

In an embodiment of the present disclosure, there is a one-to-one correspondence between the N bits used to indicate whether there are paging messages for the one or more terminal groups and the terminal groups. That is, each of the N bits corresponds to a terminal group.

In an embodiment of the present disclosure, the N bits mentioned above indicate N terminal groups. The number of terminal groups, or it can be understood as the number of reserved bits in the DCI used to indicate whether there are paging messages, can be determined as follows.

In mode 1, N is determined based on reserved bits in a last information field in the DCI in a licensed spectrum. For example, in the licensed spectrum, if the number of reserved bits in the last information field in the DCI for scheduling paging messages is 6, it can be determined that N=6, and 6 bits reserved in the last information field in DCI 1-0 can be directly used.

In mode 2, N is determined based on reserved bits in a last information field in the DCI in an unlicensed spectrum. For example, in the unlicensed spectrum, if the number of reserved bits in the last information field of the DCI for scheduling paging messages is 8, it can be determined that N=8, and 8 bits reserved in the last information field in DCI 1-0 can be directly used.

In mode 3, N is determined based on reserved bits in a Short Messages information field in the DCI. For example, when a Short Messages Indicator information field in paging DCI 1-0 indicates that "there is no short message, but there are paging messages", there are bits in the reserved state in the DCI 1-0, it can be determined that N=8, and 8 bits in the Short Messages information field can be used.

In mode 4, N is determined based on one or more reserved bits in a Short Messages information field in the DCI in a licensed spectrum and one or more reserved bits in a last information field in the DCI. For example, in the licensed spectrum, when the Short Messages Indicator information field in paging DCI 1-0 indicates "there is no short message, but there are paging messages", N=6+8=14, and 6 bits reserved in the last information field in the DCI 1-0 and 8 bits in the Short Messages information field are used. When the Short Messages Indicator information field in paging DCI 1-0 indicates "there are short messages and paging messages", N=6, and the 6 bits reserved in the last information field in the DCI 1-0 are directly used.

In mode 5, N is determined based on one or more reserved bits in a Short Messages Information field in the DCI in an unlicensed spectrum and one or more reserved bits in a last information field in the DCI. For example, in the unlicensed spectrum, when the Short Messages Indicator information field in paging DCI 1-0 indicates "there is no short message, but there are paging messages", N=8+8=16, and 8 bits reserved in the last information field in the DCI 1-0 and 8 bits in the Short Messages information field are used. When the Short Messages Indicator information field in paging DCI 1-0 indicates "there are short messages and paging messages", N=8, and the 8 bits reserved in the last information field in the DCI 1-0 are directly used.

In mode 6, N is determined based on a specified number of last bits in a Short Messages information field in the DCI. For example, N=6, the $3^{rd}$-$8^{th}$ (6 bits in total) bits of 8 bits in the Short Messages information field in paging DCI 1-0 are directly used.

In mode 7, N is determined based on a specified number of last bits in a Short Messages information field in the DCI in a licensed spectrum and one or more reserved bits in a last information field in the DCI. For example, in the licensed spectrum, N=6+6=12, 6 bits reserved in the last information field in paging DCI 1-0 and the $3^{rd}$-$8^{th}$ bits of 8 bits in the Short Messages information field are directly used.

In mode 8, N is determined based on a specified number of last bits in a Short Messages information field in the DCI in an unlicensed spectrum and one or more reserved bits in a last information field in the DCI. For example, in the unlicensed spectrum, N=8+6=14, 8 bits reserved in the last information field in paging DCI 1-0 and the $3^{rd}$-$8^{th}$ bits of 8 bits in the Short Messages information field are directly used.

It can be understood that, in the embodiments of the present disclosure, the values of N and the usage of bits in the reserved state in the DCI mentioned in the above modes are only illustrative, but not limited. For example, N can also take other values, for example, N=5, and a certain 5 bits of 6 bits (or 8 bits) reserved in the last information field of paging DCI 1-0 are directly used.

In the embodiments of the present disclosure, whether there are one or more paging messages for a terminal group can be indicated based on a bit value of each bit. For example, if a bit has a first value and a second value, the first value can be used to indicate that there are one or more paging messages for a terminal group, and the second value can be used to indicate that there is no paging message for a terminal group.

In an example, a bit value of 1 (or 0) indicates that there are one or more paging messages for one or more terminals in a terminal group to which the terminal ID belongs. A bit value of 0 (or 1) indicates that there is no paging message for the terminals in the terminal group to which the terminal ID belongs. When the Short Messages Indicator information field in the DCI for scheduling paging messages received by the terminal indicates that there are paging messages, the terminal determines whether to receive and demodulate one or more PDSCHs carrying the paging messages according to the value of 1 bit corresponding to the terminal group to which the terminal identity belongs. If the bit value is 0, it means that there is no paging message for the terminal in PDSCHs, and the terminal does not need to receive and demodulate the PDSCHs. If the bit value is 1, the terminal determines that the PDSCHs need to be received and demodulated.

In an embodiment of the present disclosure, a terminal group can be represented by one or more terminal identities. In other words, a terminal group can be understood as a terminal identity set or a collection representing a terminal identity set. In the related art, a terminal identity usually requires to be indicated by 48 bits, and a terminal identity set can be indicated by a value range in the embodiments of the present disclosure.

In an exemplary embodiment of the present disclosure, when a terminal identity set (terminal group) is indicated by a value range, the value range indicating a terminal identity set (terminal group) can be determined by one of the following ways.

In an embodiment, a value range of bits indicating terminal identities is divided into N groups of value ranges, each group of value range corresponding to a terminal group. For example, a terminal identity is indicated by 48 bits, and a total value range of the bits indicating terminal identities is 0~2^48−1. If N=6, the value range 0~2^48−1 can be divided into 6 complementary but non-overlapping value ranges. For example, the value range 0~2^48−1 can be divided into $$0 \sim \left\lfloor \frac{2^{48}-1}{6} \right\rfloor, \left\lfloor \frac{2^{48}-1}{6} \right\rfloor + 1 \sim \left\lfloor \frac{2^{48}-1}{6} \times 2 \right\rfloor,$$

$$\left\lfloor \frac{2^{48}-1}{6} \times 2 \right\rfloor + 1 \sim \left\lfloor \frac{2^{48}-1}{6} \times 3 \right\rfloor, \left\lfloor \frac{2^{48}-1}{6} \times 3 \right\rfloor + 1 \sim \left\lfloor \frac{2^{48}-1}{6} \times 4 \right\rfloor,$$

$$\left\lfloor \frac{2^{48}-1}{6} \times 4 \right\rfloor + 1 \sim \left\lfloor \frac{2^{48}-1}{6} \times 5 \right\rfloor, \left\lfloor \frac{2^{48}-1}{6} \times 5 \right\rfloor + 1 \sim 2^{48}-1.$$

When determining the terminal group to which the terminal belongs, in the N groups of value ranges divided based on the value range of bits indicating terminal identities, the terminal group corresponding to the value range corresponding to the terminal identity of the terminal can be determined as the terminal group to which the terminal belongs. For example, if a terminal identity is 1, it can be determined that the terminal group to which the terminal belongs is the terminal group corresponding to the value range of $$0 \sim \left\lfloor \frac{2^{48}-1}{6} \right\rfloor.$$

In an embodiment, a value range corresponding to values obtained after values of bits indicating terminal identities modulo a specified value is divided into N groups of value ranges, each group of value range corresponding to a terminal group. In an example, assuming N=8, a value range corresponding to values obtained after values of bits indicating terminal identities modulo a specified value is divided into 8 groups of value ranges, which are 0-127, 128-255, 256-383, 384-511, 512-639, 640-767, 768-895, 896-1023, respectively, where, the specified value for modulo can be 1024.

When determining the terminal group to which the terminal belongs, in the N groups of value ranges divided based on the value range corresponding to values obtained after values of bits indicating terminal identities modulo a specified value, the terminal group corresponding to the value range corresponding to the value obtained after modulo of the terminal identity of the terminal can be determined as the terminal group to which the terminal belongs. For example, in the above mode of grouping terminals, the terminal can obtain a modulo result by taking the value of the bit corresponding to the terminal identity of the terminal modulo 1024, and then determine its corresponding value range and corresponding terminal group according to the modulo result. For example, if the result of taking the value of the bit corresponding to the terminal identity of the terminal modulo 1024 is 1002, the terminal corresponds to the terminal group corresponding to the last bit of 8 bits which indicates whether there are one or more paging messages.

In an exemplary embodiment of the present disclosure, terminal identities are mapped into N terminal groups. For example, in an embodiment of the present disclosure, the terminal identities can be mapped into values of 1 to N by using the hash algorithm, and each value corresponds to a bit in N bits, that is, each value corresponds to a terminal group.

When determining the terminal group to which the terminal belongs, the terminal group into which the terminal identity of the terminal is mapped can be determined as the terminal group to which the terminal belongs. For example, the terminal uses a hash algorithm to map the terminal identity of the terminal into a certain value m of values from 1 to N, and the terminal group to which the terminal belongs can be understood as the terminal group corresponding to the $m^{th}$ bit of N bits.

It can be understood that, in the embodiments where the modes of grouping terminals involved in the above examples of the present disclosure are determined, the description is made in the manner of equally dividing a collection of the terminal identities. However, the embodiments of the present disclosure are not limited to the manner of equally dividing the collection of the terminal identities, and the manner of unevenly dividing can also be used. For example, in the above-mentioned mode of grouping after modulo of the values of the bits of the terminal identities, a value range corresponding to values obtained after values of bits indicating terminal identities modulo a specified value can also be divided into 8 groups of value ranges, which are 0-127, 128-190, 191-220, 221-511, 512-639, 640-767, 768-895, 896-1023, respectively.

It can be understood that the manner of grouping terminals in the embodiments of the present disclosure is not specifically limited. However, the network device and terminals need to determine the manner of grouping terminals. In an embodiment of the present disclosure, the manner of grouping terminals can be determined in one or more of the following ways.

In an exemplary embodiment of the present disclosure, the manner of grouping terminals can be determined based on a protocol, for example, a fixed manner of grouping terminals is directly agreed in a protocol.

In another exemplary embodiment of the present disclosure, the manner of grouping terminals can be configured through signaling. For example, the manner of grouping terminals is configured based on radio resource control (RRC) signaling or non-access stratum (NAS) signaling.

In an embodiment of the present disclosure, when configuring the manner of grouping terminals through signaling, the network device needs to send the determined grouping manner to terminals so that the terminals can determine the grouping manner determined by the network device. For example, in an example, after the network device has determined the grouping manner, it can send an indication signaling for indicating the grouping manner of value ranges to the terminals. For example, values for indicating critical dividing points for each of N groups of value ranges are sent to the terminals.

In an embodiment of the present disclosure, the manner of grouping terminals can be determined based on whether the number of reserved bits for indicating whether there are paging messages for one or more terminal groups will change. For example, when the grouping mode is determined and the value of N is fixed, for example, in the above mode 1, 2, 3, 6, 7 or 8 for determining N, since the value of N is fixed under different scheduling conditions, the grouping manner of determining a terminal group based on a protocol can be used, for example, a fixed grouping manner of grouping terminals is agreed by a protocol. Or, a set of grouping parameters are configured through signaling, and the grouping parameters are used to indicate a fixed grouping manner of grouping terminals, or it can be understood that a grouping manner is determined according to the grouping parameters for the fixed value of N.

For another example, when the grouping mode is determined but the value of N will change, for example, in the above mode 4 or 5 for determining N, since the value of N changes under different scheduling conditions, it is necessary to determine different grouping manners for different values of N. For example, the grouping manner of determining a terminal group based on a protocol can be used, for example, fixed grouping manners of grouping terminals corresponding to different values of N are agreed by a protocol. Or, a plurality of sets of grouping parameters are configured by signaling, and each set of grouping parameters is used to indicate a grouping manner of grouping terminals corresponding to one value of N.

In an embodiment of the present disclosure, when configuring the manner of grouping terminals through signaling, it can be understood that the manner of grouping terminals is configured by a network device such as a wireless access network device and/or core network device. When configuring the manner of grouping terminals through signaling, the network device can perform terminal grouping based on terminals corresponding to a PO, for example, different terminals corresponding to a PO are set into different terminal groups, and then different terminal groups are indicated through different bits, so that the terminal can accurately determine whether there is a paging message for itself, and the case where there is no paging message corresponding to the terminal after demodulating one or more PDSCHs corresponding to a terminal group to which the terminal belongs can be avoided.

In an example, the grouping mode of dividing a value range corresponding to values obtained after values of bits indicating terminal identities modulo a specified value into N groups of value ranges is taken as an example. It is assumed that the network device determines that there are 4 terminals corresponding to a PO (terminal 1, terminal 2, terminal 3 and terminal 4), and results obtained by taking values corresponding to the terminal identities of the 4 terminals modulo 1024 are 188, 203, 237, 696, respectively. If the fixed manner of equally dividing is adopted, terminal 1, terminal 2 and terminal 3 all correspond to the 2nd bit of the 8 bits in the reserved state in the DCI. Thus, when the DCI for scheduling paging messages received by terminal 1, terminal 2 and terminal 3 in a PO indicates that the 2nd bit is 1 ("there are one or more paging messages"), terminal 1, terminal 2 and terminal 3 determine that they need to receive and demodulate the PDSCH. However, there will be a case where the paging message carried in the PDSCH is a paging message for one of the terminals (such as terminal 1). At this time, terminal 2 and terminal 3 do not need to receive and demodulate the PDSCH, thus wasting the energy of terminal 2 and terminal 3. If the manner of grouping terminals is configured by the network device such as a base station or a core network through signaling, the terminal 1, terminal 2, terminal 3 and terminal 4 can be set into different terminal groups by the network device according to known terminal conditions. For example, the grouping manner can be 0-127, 128-190, 191-220, 221-511, 512-639, 640-767, 768-895, 896-1023. In this way, terminal 1, terminal 2, terminal 3 and terminal 4 are set into different terminal groups. When a bit corresponding to any of terminal 1, terminal 2, terminal 3 and terminal 4 is 1, the corresponding paging message can be accurately indicated.

It can be understood that, in an embodiment of the present disclosure, only the network device such as the base station or the core network can determine one or more terminals to be paged in a terminal group. A terminal cannot determine whether only the terminal itself is paged or whether other terminals are paged in the terminal group to which the terminal belongs. Therefore, if a terminal group includes a terminal and a bit in the reserved state corresponding to the terminal group indicates that there is a paging message, the terminal still needs to receive and demodulate one or more PDSCHs to determine whether there is a PDSCH for itself.

In the paging methods according to the embodiments of the present disclosure, by utilizing the bits in the reserved state in the DCI for scheduling paging messages, the DCI for scheduling paging messages can be used to notify, to a certain extent, a terminal whether there is a paging message corresponding to the terminal. If the DCI indicates that there is no paging message corresponding to the terminal, the terminal does not need to demodulate a PDSCH, which can save energy.

It can be understood that the paging methods according to the embodiments of the present disclosure can be applied in the process of interaction between the terminal and the network device. For the process of realizing paging in unlicensed or licensed frequency bands by the interaction between the terminal and the network device, please refer to the relevant description of the above embodiments, which will not be repeated herein.

Based on the same concept, the embodiments of the present disclosure also provide paging apparatuses. It can be understood that, in order to realize the above functions, a user paging apparatus according to an embodiment of the present disclosure includes corresponding hardware structures and/or software modules for performing various functions. In combination with the units and algorithm steps of each example disclosed in the embodiments of the present disclosure, the embodiments of the present disclosure can be implemented in the form of hardware or a combination of hardware and computer software. Whether a function is performed in the way of hardware or computer software driving hardware depends on the specific application and design constraints of the technical solution. Those skilled in the art can use different methods to realize the described functions for each specific application, but such implementation should not be considered beyond the scope of the technical solution of the embodiments of the present disclosure.

Figure 4:
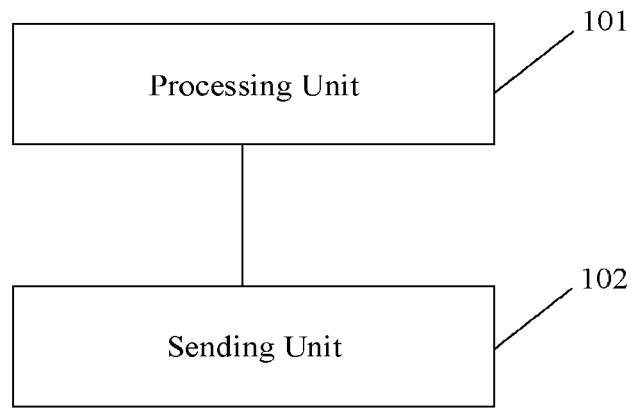
FIG. 4 is a block diagram illustrating a paging apparatus according to an exemplary embodiment.

FIG. 4 is a block diagram of a paging apparatus according to an exemplary embodiment. Referring to FIG. 4, the paging apparatus 100 is applied to a network device, and includes a processing unit 101 and a sending unit 102.

The processing unit 101 is configured to determine DCI, where the DCI includes one or more bits of which a respective bit indicates whether there are one or more paging messages for a terminal group. The sending unit 102 is configured to send the DCI. In an embodiment, the processing unit 101 is configured to determine at least part of bits in a reserved state in the DCI as the one or more bits of which a respective bit indicates indicate whether there are one or more paging messages for a terminal group. In an embodiment, the DCI is DCI for scheduling paging messages.

In another embodiment, a first value of a respective bit of the one or more bits is used to indicate that there are one or more paging messages for a terminal group, and a second value of a respective bit of the one or more bits is used to indicate that there is no paging message for a terminal group.

In another embodiment, grouping of the terminal group is determined in at least one of the following ways of dividing a value range of bits indicating terminal identities into N groups of value ranges, each group of value range corresponding to a terminal group; dividing a value range corresponding to values obtained by taking values of the bits indicating the terminal identities modulo a specified value into N groups of value ranges, each group of value range corresponding to a terminal group: or mapping the terminal identities into N terminal groups; where the N is a positive integer.

In another embodiment, the N is determined based on the one or more bits corresponding to terminal groups, and is less than or equal to a number of bits in a reserved state in the DCI.

In another embodiment, the N is determined in one of the following ways.

In mode 1, N is determined based on reserved bits in a last information field in the DCI in a licensed spectrum. For example, in the licensed spectrum, if the number of reserved bits in the last information field in the DCI for scheduling paging messages is 6, it can be determined that N=6, and 6 bits reserved in the last information field in DCI 1-0 can be directly used.

In mode 2, N is determined based on reserved bits in a last information field in the DCI in an unlicensed spectrum. For example, in the unlicensed spectrum, if the number of reserved bits in the last information field of the DCI for scheduling paging messages is 8, it can be determined that N=8, and 8 bits reserved in the last information field in DCI 1-0 can be directly used.

In mode 3, N is determined based on reserved bits in a Short Messages information field in the DCI. For example, when a Short Messages Indicator information field in paging DCI 1-0 indicates that "there is no short message, but there are paging messages", there are bits in the reserved state in the DCI 1-0, it can be determined that N=8, and 8 bits in the Short Messages information field can be used.

In mode 4, N is determined based on one or more reserved bits in a Short Messages information field in the DCI in a licensed spectrum and one or more reserved bits in a last information field in the DCI in the licensed spectrum. For example, in the licensed spectrum, when the Short Messages Indicator information field in paging DCI 1-0 indicates "there is no short message, but there are paging messages", N=6+8=14, and 6 bits reserved in the last information field in the DCI 1-0 and 8 bits in the Short Messages information field are used. When the Short Messages Indicator information field in paging DCI 1-0 indicates "there are short messages and paging messages". N=6, and the 6 bits reserved in the last information field in the DCI 1-0 are directly used.

In mode 5, N is determined based on one or more reserved bits in a Short Messages information field in the DCI in an unlicensed spectrum and one or more reserved bits in a last information field in the DCI in the unlicensed spectrum. For example, in the unlicensed spectrum, when the Short Messages Indicator information field in paging DCI 1-0 indicates "there is no short message, but there are paging messages", N=8+8=16, and 8 bits reserved in the last information field in the DCI 1-0 and 8 bits in the Short Messages information field are used. When the Short Messages Indicator information field in paging DCI 1-0 indicates "there are short messages and paging messages", N=8, and the 8 bits reserved in the last information field in the DCI 1-0 are directly used.

In mode 6, N is determined based on a specified number of last bits in a Short Messages information field in the DCI. For example, N=6, the $3^{rd}$-$8^{th}$ (6 bits in total) bits of 8 bits in the Short Messages information field in paging DCI 1-0 are directly used.

In mode 7, N is determined based on a specified number of last bits in a Short Messages information field in the DCI in a licensed spectrum and one or more reserved bits in a last information field in the DCI in the licensed spectrum. For example, in the licensed spectrum, N=6+6=12, 6 bits reserved in the last information field in paging DCI 1-0 and the $3^{rd}$-$8^{th}$ bits of 8 bits in the Short Messages information field are directly used.

In mode 8, N is determined based on a specified number of last bits in a Short Messages information field in the DCI in an unlicensed spectrum and one or more reserved bits in a last information field in the DCI in the unlicensed spectrum. For example, in the unlicensed spectrum, N=8+6=14, 8 bits reserved in the last information field in paging DCI 1-0 and the $3^{rd}$-$8^{th}$ bits of 8 bits in the Short Messages information field are directly used.

In another embodiment, the processing unit 101 is further configured to determine a grouping manner of terminal groups.

In another embodiment, the processing unit 101 determines the grouping manner of the terminal groups in at least one of the following ways of determining the grouping manner of the terminal groups based on a protocol; or configuring the grouping manner of the terminal groups based on radio resource control signaling or non-access stratum signaling.

In another embodiment, the sending unit 102 is further configured to, if the grouping manner of the terminal groups is configured based on the radio resource control signaling or the non-access stratum signaling, send the grouping manner of the terminal groups to terminals.

Figure 5:
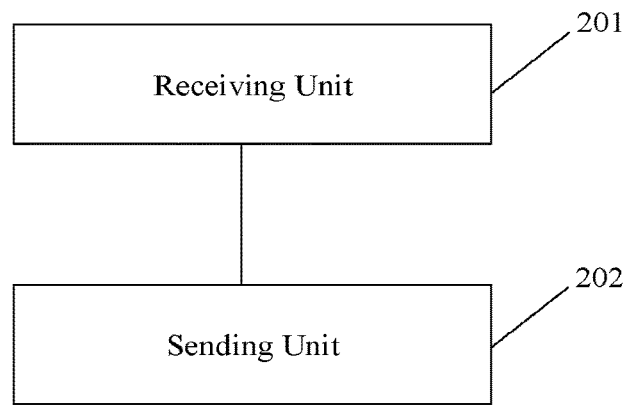
FIG. 5 is a block diagram illustrating a paging apparatus according to an exemplary embodiment.

FIG. 5 is a block diagram of a paging apparatus according to an exemplary embodiment. Referring to FIG. 5, the paging apparatus 200 is applied to a terminal, and includes a receiving unit 201 and a processing unit 202.

The receiving unit 201 is configured to obtain DCI, where the DCI includes one or more bits of which a respective bit indicates whether there are one or more paging messages for a terminal group. The processing unit is configured to determine a terminal group to which the terminal belongs, and determine whether to receive paging messages or not based on the terminal group to which the terminal belongs.

In an embodiment, the one or more bits which respectively indicate whether there are one or more paging messages for a terminal group are at least part of bits in a reserved state.

In an embodiment, the DCI is DCI for scheduling paging messages.

In another embodiment, a first value of a respective bit of the one or more bits is used to indicate that there are one or more paging messages for a terminal group, and a second value of a respective bit of the one or more bits is used to indicate that there is no paging message for a terminal group.

In another embodiment, the processing unit 202 determines the terminal group to which the terminal belongs in one of the following ways:
in N groups of value ranges divided based on a value range of bits indicating terminal identities, determining, a terminal group corresponding to a value range corresponding to a terminal identity of the terminal, as the terminal group to which the terminal belongs; in N groups of value ranges divided based on a value range corresponding to values obtained by taking values of the bits indicating the terminal identities modulo a specified value, determining, a terminal group corresponding to a value range corresponding to a value obtained by taking a value of the bits indicating a terminal identity modulo the specified value, as the terminal group to which the terminal belongs; or determining, a terminal group into which a terminal identity of the terminal is mapped, as the terminal group to which the terminal belongs; where the N is a positive integer.

In another embodiment, the N is determined based on the one or more bits corresponding to terminal groups, and is less than or equal to a number of bits in a reserved state in the DCI.

In another embodiment, the N is determined in one of the following ways.

In mode 1, N is determined based on reserved bits in a last information field in the DCI in a licensed spectrum. For example, in the licensed spectrum, if the number of reserved bits in the last information field in the DCI for scheduling paging messages is 6, it can be determined that N=6, and 6 bits reserved in the last information field in DCI 1-0 can be directly used.

In mode 2, N is determined based on reserved bits in a last information field in the DCI in an unlicensed spectrum. For example, in the unlicensed spectrum, if the number of reserved bits in the last information field of the DCI for scheduling paging messages is 8, it can be determined that N=8, and 8 bits reserved in the last information field in DCI 1-0 can be directly used.

In mode 3, N is determined based on reserved bits in a Short Messages information field in the DCI. For example, when a Short Messages Indicator information field in paging DCI 1-0 indicates that "there is no short message, but there are paging messages", there are bits in the reserved state in the DCI 1-0, it can be determined that N=8, and 8 bits in the Short Messages information field can be used.

In mode 4, N is determined based on one or more reserved bits in a Short Messages information field in the DCI in a licensed spectrum and one or more reserved bits in a last information field in the DCI in the licensed spectrum. For example, in the licensed spectrum, when the Short Messages Indicator information field in paging DCI 1-0 indicates "there is no short message, but there are paging messages", N=6+8=14, and 6 bits reserved in the last information field in the DCI 1-0 and 8 bits in the Short Messages information field are used. When the Short Messages Indicator information field in paging DCI 1-0 indicates "there are short messages and paging messages", N=6, and the 6 bits reserved in the last information field in the DCI 1-0 are directly used.

In mode 5, N is determined based on one or more reserved bits in a Short Messages information field in the DCI in an unlicensed spectrum and one or more reserved bits in a last information field in the DCI in the unlicensed spectrum. For example, in the unlicensed spectrum, when the Short Messages Indicator information field in paging DCI 1-0 indicates "there is no short message, but there are paging messages", N=8+8=16, and 8 bits reserved in the last information field in the DCI 1-0 and 8 bits in the Short Messages information field are used. When the Short Messages Indicator information field in paging DCI 1-0 indicates "there are short messages and paging messages", N=8, and the 8 bits reserved in the last information field in the DCI 1-0 are directly used.

In mode 6, N is determined based on a specified number of last bits in a Short Messages information field in the DCI. For example, N=6, the $3^{rd}$-$8^{th}$ (6 bits in total) bits of 8 bits in the Short Messages information field in paging DCI 1-0 are directly used.

In mode 7, N is determined based on a specified number of last bits in a Short Messages information field in the DCI in a licensed spectrum and one or more reserved bits in a last information field in the DCI in the licensed spectrum. For example, in the licensed spectrum, N=6+6=12, 6 bits reserved in the last information field in paging DCI 1-0 and the $3^{rd}$-$8^{th}$ bits of 8 bits in the Short Messages information field are directly used.

In mode 8, N is determined based on a specified number of last bits in a Short Messages information field in the DCI in an unlicensed spectrum and one or more reserved bits in a last information field in the DCI in the unlicensed spectrum. For example, in the unlicensed spectrum, N=8+6=14, 8 bits reserved in the last information field in paging DCI 1-0 and the $3^{rd}$-$8^{th}$ bits of 8 bits in the Short Messages information field are directly used.

In another embodiment, the processing unit 202 is further configured to determine a grouping manner of dividing terminal groups.

In another embodiment, the processing unit 202 determines the grouping manner of the terminal groups in at least one of the following ways of determining the grouping manner of the terminal groups based on a protocol; or obtaining radio resource control signaling or non-access stratum signaling, and configuring the grouping manner of the terminal groups based on the radio resource control signaling or the non-access stratum signaling.

As for the apparatuses in the above embodiments, the specific manner of each module to perform operations has been described in detail in the embodiments of the methods, and will not be described in detail herein.

Figure 6:
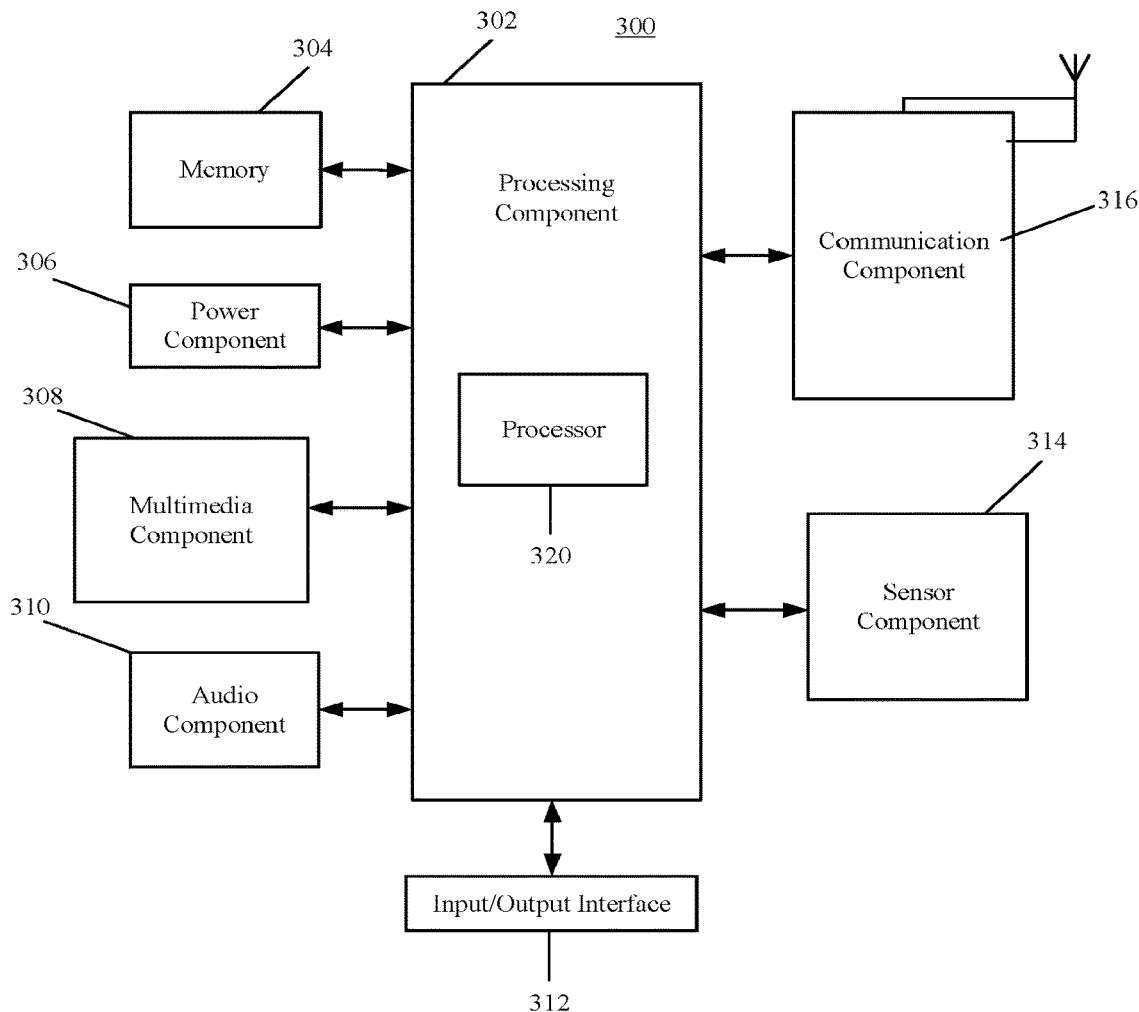
FIG. 6 is a block diagram illustrating an apparatus according to an exemplary embodiment.

FIG. 6 is a block diagram of an apparatus 300 for paging according to an exemplary embodiment. For example, the apparatus 300 may be a mobile phone, a computer, a digital broadcasting device, a messaging device, a game console, a tablet device, a medical device, a fitness device, a personal digital assistant, or the like.

Referring to FIG. 6, the apparatus 300 can include one or more of the following components: a processing component 302, a memory 304, a power component 306, a multimedia component 308, an audio component 310, an input/output (I/O) interface 312, a sensor component 314, and a communication component 316.

The processing component 302 generally controls the overall operations of the apparatus 300, such as operations associated with display, telephone calls, data communications, camera operations, and recording operations. The processing component 302 can include one or more processors 320 to execute instructions to complete all or part of the steps of the above methods. In addition, the processing component 302 can include one or more modules to facilitate interaction between the processing component 302 and other components. For example, the processing component 302 can include a multimedia module to facilitate interaction between the multimedia component 308 and the processing component 302.

The memory 304 is configured to store various types of data to support operations at the apparatus 300. Examples of such data include instructions for any application or method operating on the apparatus 300, contact data, phone book data, messages, pictures, videos, and so on. The memory 304 can be implemented by any type of volatile or non-volatile storage device or a combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk or optical disk.

The power component 306 provides power to various components of the apparatus 300. The power component 306 can include a power management system, one or more power sources, and other components associated with generating, managing, and distributing power for the apparatus 300.

The multimedia component 308 includes a screen that provides an output interface between the apparatus 300 and a user. In some embodiments, the screen can include a liquid crystal display (LCD) and a touch panel (TP). If the screen includes a touch panel, the screen can be implemented as a touch screen to receive input signals from the user. The touch panel includes one or more touch sensors to sense touches, swipes, and gestures on the touch panel. The touch sensor can not only sense boundaries of a touch or swipe action, but also detect the duration and pressure related to the touch or swipe action. In some embodiments, the multimedia component 308 includes a front camera and/or a rear camera. When the apparatus 300 is in an operation mode, such as a shooting mode or a video mode, the front camera and/or the rear camera can receive external multimedia data. Each of the front and rear cameras can be a fixed optical lens system or have focal length and optical zooming capabilities.

The audio component 310 is configured to output and/or input audio signals. For example, the audio component 310 includes a microphone (MIC) that is configured to receive external audio signals when the apparatus 300 is in an operation mode, such as a call mode, a recording mode, and a voice recognition mode. The received audio signals can be further stored in the memory 304 or transmitted via the communication component 316. In some embodiments, the audio component 310 further includes a speaker for outputting audio signals.

The I/O interface 312 provides an interface between the processing component 302 and peripheral interface modules. The peripheral interface modules can be keyboards, a click wheels, a buttons, or the like. These buttons can include, but are not limited to, home button, volume button, start button, and lock button.

The sensor component 314 includes one or more sensors for providing the apparatus 300 with status assessment in various aspects. For example, the sensor component 314 can detect an open/closed state of the apparatus 300, relative positioning of components, such as the display and keypad of the apparatus 300. The sensor component 314 can also detect a change in position of the apparatus 300 or a component of the apparatus 300, the presence or absence of user contact with the apparatus 300, orientation or acceleration/deceleration of the apparatus 300, and temperature change of the apparatus 300. The sensor component 314 can include a proximity sensor configured to detect the presence of nearby objects without any physical contact. The sensor assembly 314 can also include a light sensor, such as a Complementary Metal-Oxide-Semiconductor (CMOS) or Charged Coupled Device (CCD) image sensor, for use in imaging applications. In some embodiments, the sensor component 314 can further include an acceleration sensor, a gyro sensor, a magnetic sensor, a pressure sensor, or a temperature sensor.

The communication component 316 is configured to facilitate wired or wireless communication between the apparatus 300 and other devices. The apparatus 300 can access a wireless network based on any communication standard, such as Wi-Fi, 2G or 3G, or a combination thereof. In an exemplary embodiment, the communication component 316 receives broadcast signals or broadcast-related information from an external broadcast management system via a broadcast channel. In one exemplary embodiment, the communication component 316 also includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an exemplary embodiment, the apparatus 300 can be implemented by one or more application specific integrated circuits (ASICs), digital signal processors (DSPs), digital signal processing devices (DSPDs), programmable logic devices (PLDs), field programmable gate arrays (FPGAs), controllers, microcontrollers, microprocessors or other electronic components for performing the above methods.

In an exemplary embodiment, there is also provided a non-transitory computer readable storage medium including executable instructions, such as the memory 304 including executable instructions executable by the processor 320 of the apparatus 300 to implement the above methods. For example, the non-transitory computer readable storage medium can be a ROM, a random access memory (RAM), a CD-ROM, a magnetic tape, a floppy disk, and an optical data storage device, etc.

Figure 7:
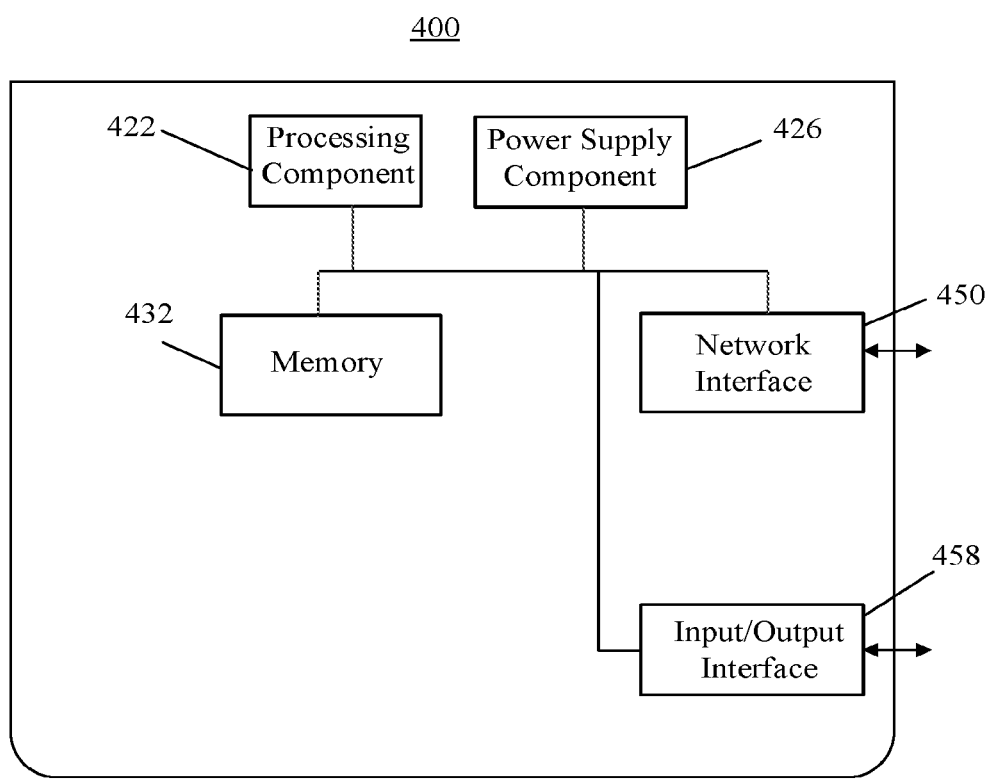
FIG. 7 is a block diagram illustrating an apparatus according to an exemplary embodiment.

FIG. 7 is a block diagram of an apparatus 400 for paging according to an exemplary embodiment. For example, the apparatus 400 may be provided as a network device, such as a base station or the like. Referring to FIG. 7, the apparatus 400 includes a processing component 422, which further includes one or more processors, and a memory resource represented by a memory 432 for storing instructions executable by the processing component 422, such as an application program. The application program stored in memory 432 may include one or more modules, each corresponding to a set of instructions. In addition, the processing component 422 is configured to execute the instructions to perform the above described methods.

The apparatus 400 may also include a power supply component 426 configured to perform power management of the apparatus 400, a wired or wireless network interface 450 configured to connect the apparatus 400 to a network, and an input/output (I/O)) interface 458. The apparatus 400 may operate based on an operating system stored in the memory 432, such as Windows Server™, Mac OS X™, Unix™, Linux™, FreeBSD™ or the like.

In the exemplary embodiment, a non-transitory computer readable storage medium including instructions is also provided, such as a memory 432 including instructions, which can be executed by the processing component 422 of the apparatus 400 to complete the above method. For example, the non-transitory computer readable storage medium can be a ROM, a random access memory (RAM), a CD-ROM, a magnetic tape, a floppy disk, and an optical data storage device, etc.

It can be further understood that "a plurality of" in the present disclosure refers to two or more, and other quantifiers are similar to it. "And/or" describes the association relationship of association objects, indicating that there can be three kinds of relationships, for example, A and/or B, which can indicate that there are three cases: A alone, A and B together, and B alone. The character "/" generally indicates that the context objects are in an "or" relationship. The singular forms of "a", "said" and "the" are also intended to include the plural form, unless the context clearly indicates other meanings.

It is further understood that the terms "first", "second", etc. are used to describe various information, but such information should not be limited to these terms. These terms are only used to distinguish the same type of information from each other, and do not indicate a specific order or importance. In fact, expressions such as "first" and "second" can be used interchangeably. For example, without departing from the scope of the present disclosure, the first information can also be called the second information, and similarly, the second information can also be called the first information.

It can be further understood that in the embodiments of the present disclosure, although operations are described in a specific order in the accompanying drawings, it should not be understood that these operations are required to be performed in the specific order shown or in a serial order, or that all the operations shown are required to obtain the desired results. In a particular environment, multitasking and parallel processing may be advantageous.

Those skilled in the art will readily recognize other embodiments of the present disclosure upon consideration of the specification and practice of the present disclosure disclosed herein. The present disclosure is intended to cover any variations, uses, or adaptations of the present disclosure, which follow general principles of the present disclosure and include common knowledge or customary means in the art that are not disclosed in the present disclosure. The specification and embodiments are exemplary only, with the true scope and spirit of the present disclosure being indicated by the following claims.

It should be understood that the present disclosure is not limited to the precise structure that has been described above and shown in the drawings, and various modifications and changes may be made without departing from the scope thereof. The scope of the present disclosure is limited only by the appended claims.

The invention claimed is:

1. A paging method, applied to a network device, the paging method comprising:
 determining downlink control information, wherein the downlink control information comprises one or more bits of which a respective bit indicates whether there are one or more paging messages for a terminal group; and
 sending the downlink control information;
 wherein a number N of terminal groups is determined in one of following ways:
 determining the N based on reserved bits in a last information field in the downlink control information in a licensed spectrum;

determining the N based on reserved bits in a last information field in the downlink control information in an unlicensed spectrum;

determining the N based on one or more reserved bits in a Short Messages information field in the downlink control information in a licensed spectrum and one or more reserved bits in a last information field in the downlink control information in the licensed spectrum;

determining the N based on one or more reserved bits in a Short Messages information field in the downlink control information in an unlicensed spectrum and one or more reserved bits in a last information field in the downlink control information in the unlicensed spectrum;

determining the N based on a specified number of last bits in a Short Messages information field in the downlink control information;

determining the N based on a specified number of last bits in a Short Messages information field in the downlink control information in a licensed spectrum and one or more reserved bits in a last information field in the downlink control information in the licensed spectrum; or determining the N based on a specified number of last bits in a Short Messages information field in the downlink control information in an unlicensed spectrum and one or more reserved bits in a last information field in the downlink control information in the unlicensed spectrum.

2. The paging method according to claim 1, wherein determining the downlink control information comprises:
determining at least part of bits in a reserved state in the downlink control information as the one or more bits.

3. The paging method according to claim 1, wherein the downlink control information is downlink control information for scheduling paging messages.

4. The paging method according to claim 1, wherein a first value of a respective bit of the one or more bits is used to indicate that there are one or more paging messages for a terminal group, and a second value of a respective bit of the one or more bits is used to indicate that there is no paging message for a terminal group.

5. The paging method according to claim 1, wherein the terminal group is formed in at least one of the following ways:
dividing a value range of bits indicating terminal identities into the N groups of value ranges, each group of value range corresponding to a terminal group;
dividing a value range corresponding to values obtained by taking values of the bits indicating the terminal identities modulo a specified value into the N groups of value ranges, each group of value range corresponding to a terminal group; or
mapping the terminal identities into the N terminal groups;
wherein the N is a positive integer.

6. The paging method according to claim 5, wherein the N is determined based on the one or more bits corresponding to terminal groups, and is less than or equal to a number of bits in a reserved state in the downlink control information.

7. The paging method according to claim 1, further comprising:
determining a grouping manner of terminal groups;
wherein the grouping manner of the terminal groups is determined in at least one of the following ways:
determining the grouping manner of the terminal groups based on a protocol; or configuring the grouping manner of the terminal groups based on radio resource control signaling or non-access stratum signaling.

8. The paging method according to claim 7, further comprising:
if the grouping manner of the terminal groups is configured based on the radio resource control signaling or the non-access stratum signaling, sending the grouping manner of the terminal groups to terminals.

9. A paging method, applied to a terminal, the paging method comprising:
obtaining downlink control information, wherein the downlink control information comprises one or more bits of which a respective bit indicates whether there are one or more paging messages for a terminal group; and
determining a terminal group to which the terminal belongs, and determining whether to receive paging messages or not based on the terminal group to which the terminal belongs and a bit corresponding to the terminal group;
wherein a number N of terminal groups is determined in one of following ways:
determining the N based on reserved bits in a last information field in the downlink control information in a licensed spectrum;
determining the N based on reserved bits in a last information field in the downlink control information in an unlicensed spectrum;
determining the N based on one or more reserved bits in a Short Messages information field in the downlink control information in a licensed spectrum and one or more reserved bits in a last information field in the downlink control information in the licensed spectrum;
determining the N based on one or more reserved bits in a Short Messages information field in the downlink control information in an unlicensed spectrum and one or more reserved bits in a last information field in the downlink control information in the unlicensed spectrum;
determining the N based on a specified number of last bits in a Short Messages information field in the downlink control information;
determining the N based on a specified number of last bits in a Short Messages information field in the downlink control information in a licensed spectrum and one or more reserved bits in a last information field in the downlink control information in the licensed spectrum; or
determining the N based on a specified number of last bits in a Short Messages information field in the downlink control information in an unlicensed spectrum and one or more reserved bits in a last information field in the downlink control information in the unlicensed spectrum.

10. The paging method according to claim 9, wherein the one or more bits are at least part of bits in a reserved state in the downlink control information.

11. The paging method according to claim 9, wherein the downlink control information is downlink control information for scheduling paging messages.

12. The paging method according to claim 9, wherein a first value of a respective bit of the one or more bits is used to indicate that there are one or more paging messages for a terminal group, and a second value of a respective bit of the one or more bits is used to indicate that there is no paging message for a terminal group.

13. The paging method according to claim 9, wherein the terminal group to which the terminal belongs is determined in one of the following ways:
- in the N groups of value ranges divided based on a value range of bits indicating terminal identities, determining, a terminal group corresponding to a value range corresponding to a terminal identity of the terminal, as the terminal group to which the terminal belongs;
- in the N groups of value ranges divided based on a value range corresponding to values obtained by taking values of the bits indicating the terminal identities modulo a specified value, determining, a terminal group corresponding to a value range corresponding to a value obtained by taking a value of the bits indicating a terminal identity modulo the specified value, as the terminal group to which the terminal belongs; or
- determining, a terminal group into which a terminal identity of the terminal is mapped, as the terminal group to which the terminal belongs;
- wherein the N is a positive integer.

14. The paging method according to claim 13, wherein the N is determined based on the one or more bits corresponding to terminal groups, and is less than or equal to a number of bits in a reserved state in the downlink control information.

15. The paging method according to claim 9, further comprising:
- determining a grouping manner of terminal groups;
- wherein the grouping manner of the terminal groups is determined in at least one of the following ways:
- determining the grouping manner of the terminal groups based on a protocol; or
- obtaining radio resource control signaling or non-access stratum signaling, and configuring the grouping manner of the terminal groups based on the radio resource control signaling or the non-access stratum signaling.

16. A paging apparatus, comprising:
a processor; and
a memory configured to store instructions executable by the processor;
wherein the processor is configured to execute the instructions to perform:
determining downlink control information, wherein the downlink control information comprises one or more bits of which a respective bit indicates whether there are one or more paging messages for a terminal group; and
sending the downlink control information;
wherein a number N of terminal groups is determined in one of following ways:
- determining the N based on reserved bits in a last information field in the downlink control information in a licensed spectrum;
- determining the N based on reserved bits in a last information field in the downlink control information in an unlicensed spectrum;
- determining the N based on one or more reserved bits in a Short Messages information field in the downlink control information in a licensed spectrum and one or more reserved bits in a last information field in the downlink control information in the licensed spectrum;
- determining the N based on one or more reserved bits in a Short Messages information field in the downlink control information in an unlicensed spectrum and one or more reserved bits in a last information field in the downlink control information in the unlicensed spectrum;
- determining the N based on a specified number of last bits in a Short Messages information field in the downlink control information;
- determining the N based on a specified number of last bits in a Short Messages information field in the downlink control information in a licensed spectrum and one or more reserved bits in a last information field in the downlink control information in the licensed spectrum; or
- determining the N based on a specified number of last bits in a Short Messages information field in the downlink control information in an unlicensed spectrum and one or more reserved bits in a last information field in the downlink control information in the unlicensed spectrum.

17. A paging apparatus, comprising:
a processor; and
a memory configured to store instructions executable by the processor;
wherein the processor is configured to execute the paging method according to claim 9.

18. A non-transitory computer readable storage medium, wherein when instructions in the non-transitory computer readable storage medium are executed by a processor of a network device, the network device is enabled to execute the paging method according to claim 1.

19. A non-transitory computer readable storage medium, wherein when instructions in the non-transitory computer readable storage medium are executed by a processor of a mobile terminal, the mobile terminal is enabled to execute the paging method according to claim 9.

* * * * *